United States Patent Office 3,465,856
Patented Sept. 9, 1969

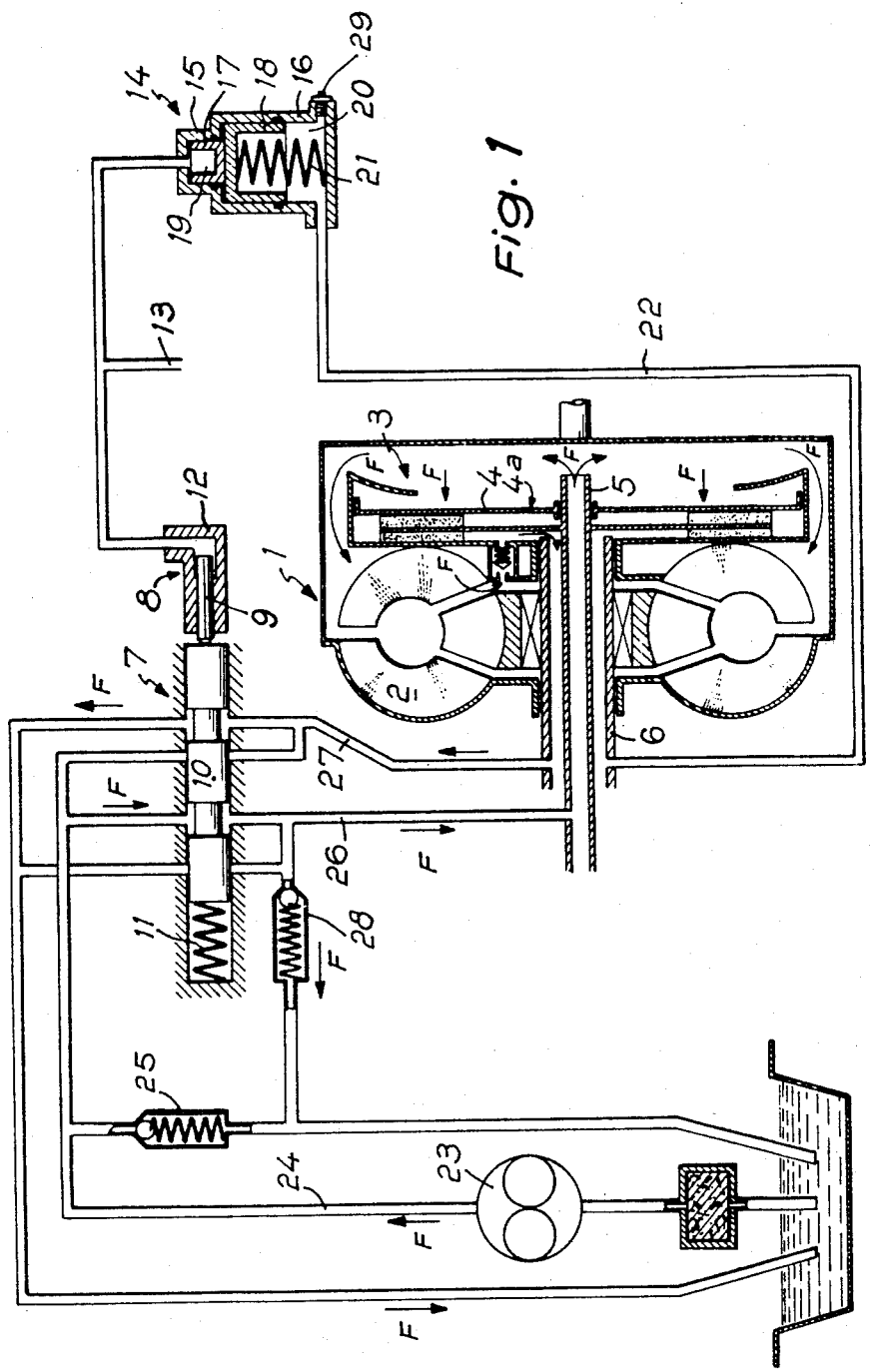

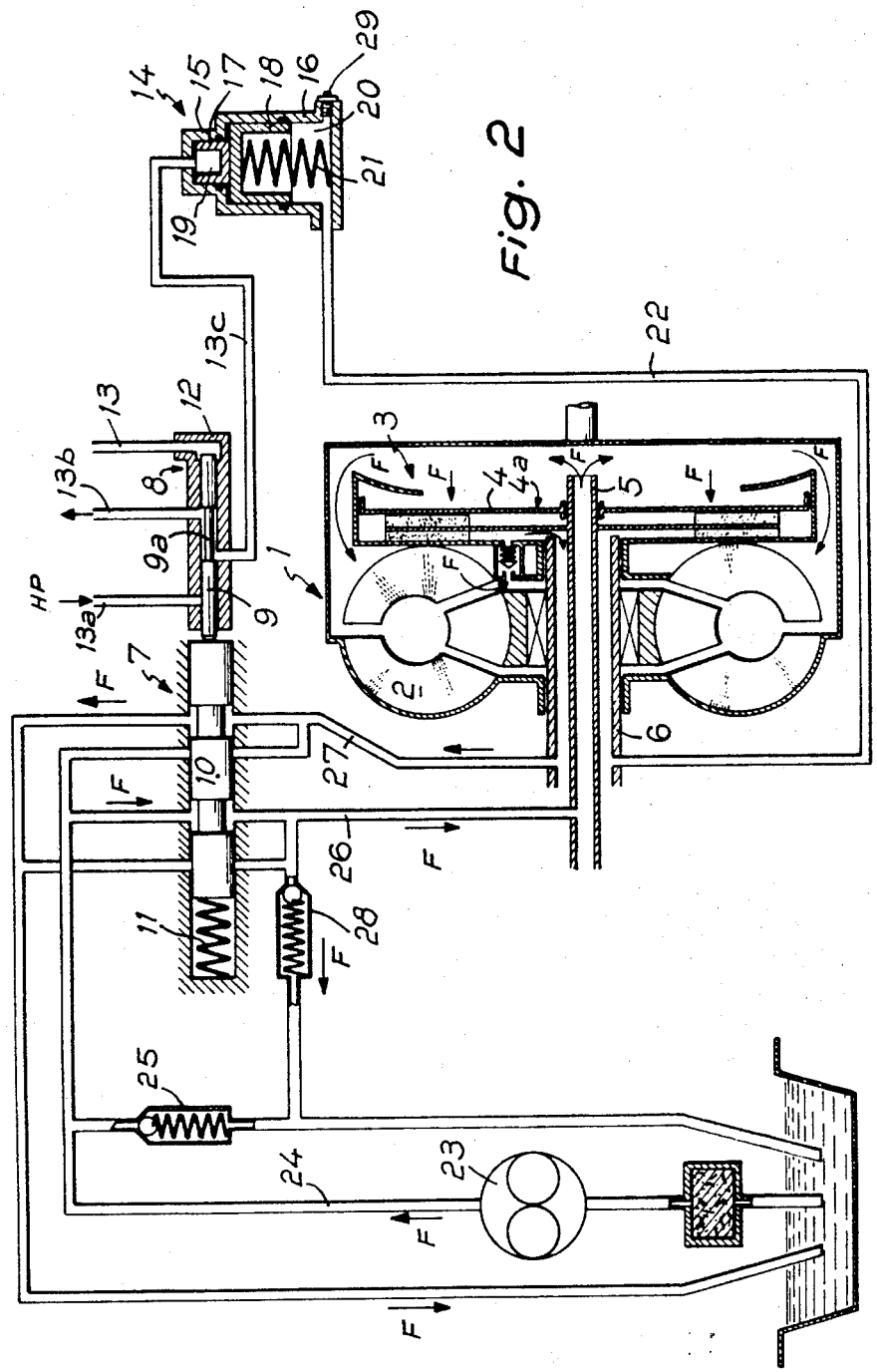

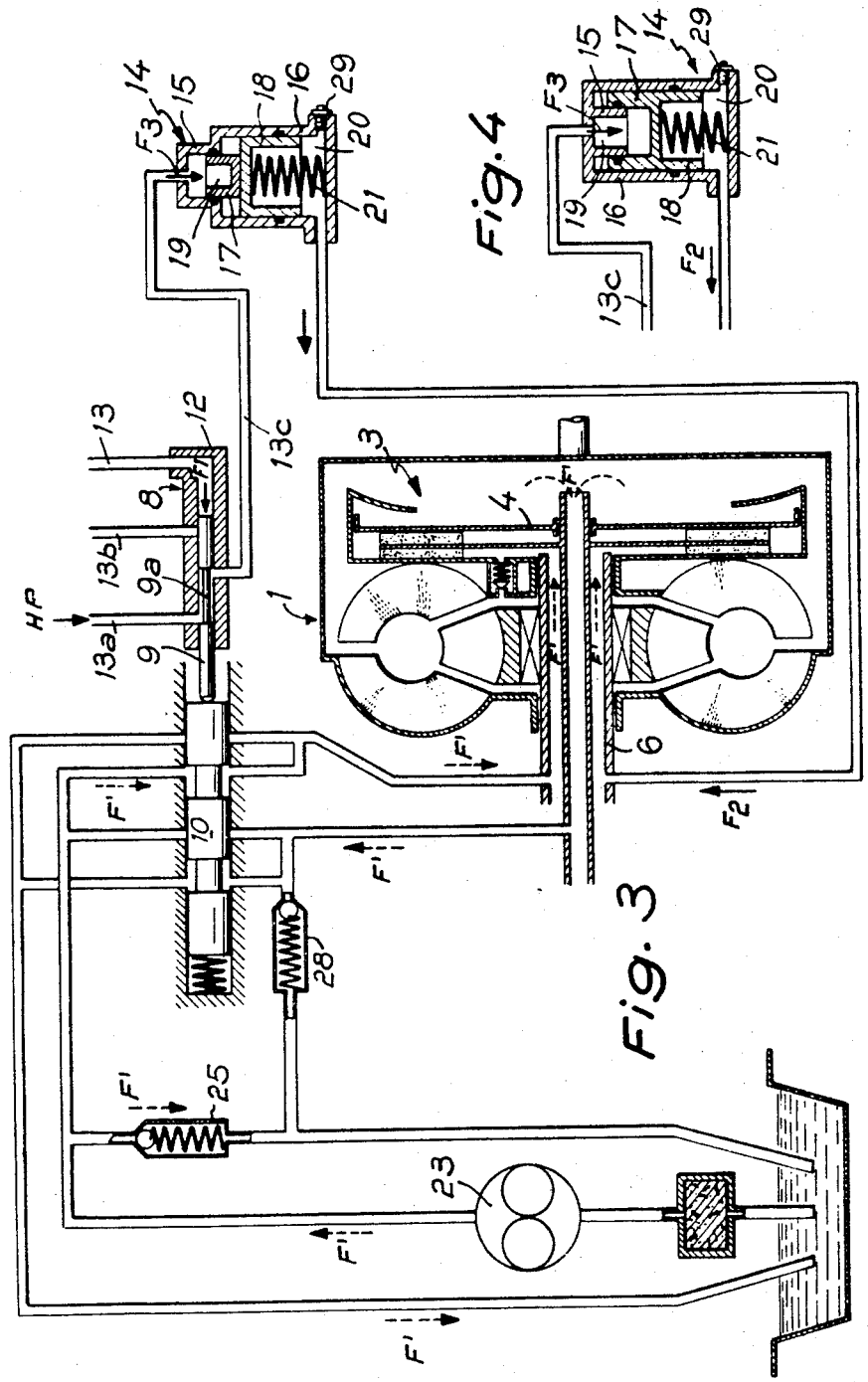

3,465,856
APPARATUS FOR ACCELERATING THE DISENGAGEMENT OF A MECHANICAL CLUTCH MEMBER INCORPORATED IN A HYDROKINETIC TORQUE CONVERTER
Edmond Henry-Biabaud, Paris, France, assignor to Societe Anonyme Andre Citroen, Paris, France, a French society
Filed Dec. 13, 1966, Ser. No. 601,514
Claims priority, application France, Dec. 17, 1965, 42,834
Int. Cl. F16d *37/00, 21/00*
U.S. Cl. 192—3.33   3 Claims

ABSTRACT OF THE DISCLOSURE

Means and apparatus for hydraulically accelerating the disengagement of a mechanical clutch member incorporated in a torque converter supplied by a hydraulic circuit having two directions of fluid flow consisting of introducing a supplementary volume of fluid under pressure into the circuit when the direction of the flow of the fluid is reversed in order to disengage the clutch.

---

The present invention relates to a method of and apparatus for accelerating the disengagement, under the action of a fluid under pressure supplied by a pump, of a mechanical clutch member incorporated in a hydrokinetic torque converter.

In certain motor vehicles, a power transmission is used which essentially comprises a hydrokinetic torque converter associated with a mechanical clutch, operating in oil, connected to the output turbine of the converter, for the purpose of driving the road wheels through a conventional gear box. An axially movable plate adjacent the mechanical clutch produces the engagement or rest position of this latter. To this end, this plate is exposed on one or the other of its faces to oil under pressure which can pass through the converter. The reversal of the direction of flow of this oil causes the pressure to exert itself on one or the other of the faces of the plate and consequently produces the engagement or disengagement of the mechanical member. The desired reversal is effected by means of a distributor. The slide of this latter is controlled by a hydraulic jack supplied with fluid under high pressure.

A circuit of this type with two directions of flow was described in the patent application Ser. No. 583,332 filed on Sept. 30, 1966 by Jean G. Cadiou under the title "Hydraulically-Operable Torque-Converter and Mechanical Clutch Arrangement," and now Patent No. 3,415,345.

It is an object of the invention to increase the speed of disengagement, and accordingly, the invention proposes to introduce a supplementary volume of fluid under pressure into the hydraulic circuit when the direction of flow of the fluid is reversed in order to cause the disengagement of the mechanical member.

This method of operation is preferably carried out in combination with means comprising two discharge valves which open at different values of pressure, such as that forming the subject of the above-mentioned patent.

The invention thus also consists in apparatus comprising a torque converter supplied, by means of a distributor, through a circuit with two directions of flow, of which one of the driven-driving members is secured to a mechanical clutch actuated by the fluid passing through the converter, a member being provided for delivering the fluid under pressure, the delivery aperture of which is connected to the hydraulic circuit and the operation of which is synchronized with the displacement of the distributor slide controlling the flow of the fluid of the hydraulic circuit in the direction of disengagement of the mechanical clutch member.

The invention will be more readily understood and secondary characteristics, as well as its advantages, will appear in the course of the following description of some embodiments thereof, given by way of example, with reference to the accompanying drawings, in which:

FIGURE 1 is a simplified representation of a power transmission with torque converter with a mechanical clutch incorporated therein and its control circuit comprising a fluid delivery member according to the invention.

FIGURE 2 shows a modification of the transmission of FIGURE 1 with an independent distributor for controlling the fluid delivery member.

FIGURE 3 shows the transmission of FIGURE 2 with the control members placed in another position, and FIGURE 4 is a sectional view through a modification of a fluid delivery member according to the invention.

Referring now to the drawings, FIGURE 1 shows a torque converter generally designated at 1, having an impeller wheel 2 which drives a turbine wheel connected to a mechanical clutch generally designated at 3. This latter can be engaged with the aid of a plate 4 mounted to slide on a driven hollow shaft 5 which is itself located inside another hollow shaft 6. As such an assembly is already known in the art, it is not necessary to describe it in greater detail. It is sufficient to note here that the hollow concentric shafts 5 and 6 constitute an oil-distributing circuit in which the flow takes place in the direction of the arrows F (FIGURES 1 and 2) or in the direction of arrows F' (FIGURE 3).

In the first case, the oil under pressure bears upon the face 4a (on the right-hand side of FIGURES 1 and 2) of the plate 4 and engages the clutch 3 as is shown in FIGURES 1 and 2.

The reversal of the direction of flow is effected by means of a distributor generally designated at 7 whose control is ensured by a jack or piston valve 8. The piston or rod 9 of the latter is capable of pushing the piston or slide 10 of the distributor 7 back against the action of a return spring 11.

The cylinder 12 of the jack 8 is connected to a tube 13 which supplies high pressure fluid and which also communicates with a fluid delivery device generally designated as 14 and also known as a pressure feed device. In the examples shown in FIGS. 1–3, this latter is composed of two cylinders 15 and 16 connected end to end and each closed at its other end. The cylinder 15 has a diameter which is appreciably smaller than the cylinder 16. Two pistons 17–18 are mounted to slide respectively in the cylinders 15 and 16 by defining with said latter, respectively, a chamber 19 and a chamber 20. The latter is provided with a draining device 29.

The tube 13 ends in the chamber 19 whilst the chamber 20, in which a return spring 21 is housed, is placed in communication, by a tube 22, with the interior of the hollow shaft 6.

It is possible not to supply fluid under high pressure directly to the chamber 19 of the pressure feed device 14.

In FIGURE 2, the cylinder 12 is connected to a tube 13 supplying fluid under pressure, a supply tube 13a under high pressure and to a return tube 13b. It also communicates, through a tube 13c, with the fluid pressure feed device 14.

The tube 13 ends in the right-hand chamber of the jack 8, the piston or slide 9 of which has a recess 9a permitting switching between the tube 13 under high pressure HP or the return tube 13b and the tube 13c which ends in the pressure feed device 14. The chamber 20, in which a return spring 21 is housed, is placed in communication, through a tube 22, with the interior of the hollow shaft 6.

FIGURE 4 shows a modification of the pressure feed device 14. The same members have been designated by the same reference numerals. Instead of the cylinder 15 with the small diameter being outside the cylinder 16 with the large diameter, it is housed inside said latter and the piston 17 surrounds the cylinder 15, thus defining therewith the chamber 19.

In all cases, the fluid under pressure necessary for operating the clutch 3 is supplied by a pump 23 by a tube 24 which is connected to the distributor 7. On this tube there is mounted a first delivery valve 25 adjusted to maintain a high pressure in tube 24. The distributor 7 is connected by a tube 26 to the hollow shaft 5 and by a tube 27 to the hollow shaft 6. There is mounted on the tube 26 a second delivery valve 28 adjusted to maintain a low pressure in tube 26.

This part of the installation is described in detail in the above-mentioned patent application. However, as has already been said, the present invention does not impose the use of two delivery valves with different adjustments.

The operation is as follows:

FIGURE 1 shows the arrangement of the members when the mechanical clutch 3 is in use. The fluid under pressure supplied by the pump 23 flows in the direction indicated by the arrows F. After flowing through the hollow shaft 5, it acts upon the face 4a of the plate 4, penetrates into the converter 2 through which it passes and returns through the hollow shaft 6. Under these conditions, this fluid fills the chamber 20 of the pressure feed device 14 through the tube 22. Its pressure is determined by the delivery valve 28 adjusted to maintain the low pressure.

When it is desired to effect a change of transmission ratio, the mechanical clutch 3 must be disengaged quickly and unhesitatingly. This operation is controlled by sending a high pressure fluid into the tube 13. FIGURE 3 shows the arrangement of the members just after this manoeuvre has been effected.

The piston 9 pushed back by the pressure acting in the direction $F_1$ has displaced the piston 10. The fluid supplied by the pump 23 now flows in the direction indicated by the arrows F'.

The delivery valve 28 no longer operates to effect the pressure in the circuit; the delivery valve 25, the only one in circuit, tends to establish the pressure of the fluid at a higher value. This rise in pressure necessitates a certain amount of time during which the feed device 14 comes into operation. In fact, in the case of FIGURE 3, when the piston 10 is displaced by the piston 9, this latter isolates the tube 13c from the return tube 13b and places it in communication with the tube 13a, thus admitting liquid under high pressure into the chamber 19 to act on the piston 17. In the case of FIGURE 1, the high pressure fluid arrives directly in the chamber 19. By reason of the ratio of the useful sections of the pistons 17 and 18 and the pressures which they support, these latter are displaced whilst driving, the fluid which filled the chamber 20 in the direction of the arrow $F_2$. Their new position can be seen in FIGURE 3.

On arriving in the hollow shaft 6, the fluids acting in the directions F' on the one hand and $F_2$ on the other hand, combine to push back the plate 4 and to bring about the desired disengagement.

The pressure feed device 14 diminishes the time required for disengaging the clutch after the distributor piston 10 is moved to reverse the direction of the fluid acting on the plate 4.

What is claimed is:

1. An apparatus for accelerating the disengagement of a mechanical clutch from the impeller of a torque converter comprising: a hydraulic circuit having two directions of fluid flow, one direction of flow inducing the engagement of said clutch, the other direction inducing the disengagement of said clutch; hydraulic fluid distributor means having a piston and a slide, said piston being movable to engage and move said slide, said slide being movable to control the direction of fluid flow through said circuit to said mechanical clutch; the improvement comprising a fluid delivery device having inlet and outlet means, the outlet of which is connected to the hydraulic circuit to feed fluid under pressure in the direction of flow which induces disengagement of the mechanical clutch, the operation of said fluid delivery device being synchronized with the displacement of said piston in the direction thereof which moves said slide to induce disengagement of said mechanical clutch.

2. An apparatus for accelerating the disengagement of a mechanical clutch from the impeller of a torque converter, a hydraulic circuit having two directions of fluid flow, one direction inducing the engagement of said clutch, the other direction inducing disengagement of said clutch, hydraulic fluid distributor means having a piston and a slide, said piston being movable to engage said slide and move said slide to cause fluid flow in said circuit in the direction to induce disengagement of said clutch, the improvement comprising a fluid delivery device having a cylinder with two different diameters, two coupled pistons of dissimilar size, one piston for each of said diameters, a first chamber being defined by the larger of said pistons and the portion of said cylinder having the larger diameter, a conduit connecting said first chamber to the hydraulic circuit, and a second chamber defined by the smaller of said pistons and the portion of said cylinder of smaller diameter, a high pressure fluid pipe leading from said piston of said distributor for reversing the direction of circulation of said fluid, said high pressure fluid pipe being connected to said second chamber so that when said piston moves against said slide, said fluid will flow through said high pressure pipe into said second chamber to move said coupled pistons to force fluid out of said first chamber in the direction to induce disengagement of said mechanical clutch so as to synchronize the operation of said fluid delivery device with said displacement of said slide.

3. Apparatus according to claim 2, wherein said distributor is controlled by a control jack and said second chamber is connected to said high pressure fluid pipe by means of said distributor.

References Cited

UNITED STATES PATENTS

| 2,833,385 | 5/1958 | Peterson et al. | 192—86 X |
| 3,202,018 | 8/1965 | Hilpert | 192—3.33 X |
| 3,224,537 | 12/1965 | Hilpert | 192—3.33 X |
| 3,228,503 | 1/1966 | Maurice | 192—3.33 X |
| 3,235,043 | 2/1966 | Maurice et al. | 192—3.33 X |

BENJAMIN W. WYCHE III, Primary Examiner

U.S. Cl. X.R.

192—86